(12) United States Patent
Tandler (10) Patent No.: US 9,244,261 B2
(45) Date of Patent: *Jan. 26, 2016

(54) WINDOW BLIND SOLAR ENERGY MANAGEMENT SYSTEM

(71) Applicant: MBC Ventures, Inc., Baltimore, MD (US)

(72) Inventor: John Joseph Tandler, Arvada, CO (US)

(73) Assignee: MBC VENTURES, INC., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/388,278

(22) PCT Filed: Mar. 26, 2013

(86) PCT No.: PCT/US2013/033879
§ 371 (c)(1),
(2) Date: Sep. 26, 2014

(87) PCT Pub. No.: WO2013/148684
PCT Pub. Date: Oct. 3, 2013

(65) Prior Publication Data
US 2015/0168700 A1    Jun. 18, 2015

Related U.S. Application Data

(60) Provisional application No. 61/615,389, filed on Mar. 26, 2012, provisional application No. 61/703,606, filed on Sep. 20, 2012.

(51) Int. Cl.
*F21S 11/00*    (2006.01)
*G02B 19/00*    (2006.01)
(Continued)

(52) U.S. Cl.
CPC ............ *G02B 19/0019* (2013.01); *E06B 9/303* (2013.01); *E06B 9/386* (2013.01); *F21S 11/007* (2013.01); *G02B 17/00* (2013.01); *G02B 17/006* (2013.01); *G02B 19/0042* (2013.01); *E06B 2009/2417* (2013.01)

(58) Field of Classification Search
CPC   F21S 11/00; F21S 11/007; E06B 2009/2417; G02B 19/0042; G02B 17/006
USPC ........... 359/596, 591–594; 160/187, 162, 165
See application file for complete search history.

(56) References Cited

U.S. PATENT DOCUMENTS 2,146,816 A  *  2/1939  Grassby, Jr. ........... 160/178.1 R
4,023,555 A      5/1977  Bailey
(Continued)

OTHER PUBLICATIONS

International Search Report issued in corresponding international application No. PCT/US2013/033879 on Jul. 9, 2013.

*Primary Examiner* — Christopher Mahoney
(74) *Attorney, Agent, or Firm* — Whiteford, Taylor & Preston, LLP; Gregory M. Stone (57) ABSTRACT

Disclosed is a window blind solar energy management system for capturing solar energy to manage illumination and temperature within a defined space. Blinds comprising curved louvers are hung from the internal frame of a window, each louver having a concave, highly reflecting specular mirrored surface that focuses incoming solar beam radiation onto a thin area on the back of the adjacent louver. The angle of the louvers is adjusted by an integral automatic controller so that the thin strip of light can be focused on one or two of three regions on the back of the adjacent louver which are designed to either reflect, absorb, or reject the incoming light.

19 Claims, 5 Drawing Sheets

(51) Int. Cl.
*G02B 17/00* (2006.01)
*E06B 9/303* (2006.01)
*E06B 9/386* (2006.01)
*E06B 9/24* (2006.01)

(56) References Cited

U.S. PATENT DOCUMENTS

| | | | |
|---|---|---|---|
| 4,292,763 A | 10/1981 | Barnes et al. | |
| 4,509,825 A | 4/1985 | Otto et al. | |
| 4,699,467 A | 10/1987 | Bartenbach et al. | |
| 4,715,358 A | 12/1987 | Koster | |
| 4,773,733 A * | 9/1988 | Murphy et al. | 359/593 |
| 5,204,777 A * | 4/1993 | Curshod | 359/596 |
| 5,650,875 A * | 7/1997 | Kanada et al. | 359/592 |
| 6,134,842 A | 10/2000 | Cheng et al. | |
| 6,239,910 B1 * | 5/2001 | Digert | 359/596 |
| 7,843,639 B2 * | 11/2010 | Oyama | 359/591 |
| 7,843,640 B2 * | 11/2010 | Hooper, Jr. | 359/596 |
| 8,837,049 B2 | 9/2014 | Tandler | |
| 2003/0112518 A1 | 6/2003 | Rogers et al. | |
| 2004/0036492 A1 | 2/2004 | Gaasch et al. | |
| 2005/0081909 A1 | 4/2005 | Paull | |
| 2012/0120496 A1 * | 5/2012 | Thuot et al. | 359/596 |

* cited by examiner

WINDOW BLIND SOLAR ENERGY MANAGEMENT SYSTEM

TECHNICAL FIELD

This invention relates to radiant energy management, and more particularly to systems for capturing solar energy to manage illumination and temperature within a defined space.

BACKGROUND ART

As an architectural feature, a window provides daylight to an interior space and allows the building occupants a view to the outside. When direct beam solar radiation falls directly on a window, the light that enters has an intensity of several hundred watts per square meter and is generally too bright to be used directly as illumination. The light must be attenuated, diffused, or reflected onto the ceiling and walls of the room by a window treatment to provide comfortable illumination. Daylight harvesting systems are now commonly employed which automatically dim or turn off lighting in the vicinity of windows when natural light is available to reduce energy consumption and building heat load.

Typical solutions for attenuation of incoming sunlight include opaque or translucent shades, blinds, and curtains. These can reflect a portion of the incoming solar radiation to reduce light levels and glare, but have the disadvantage of having only coarse controllability and do not provide illumination to the area away from the window deeper into the room. More sophisticated blinds and fixed reflecting louvers are available that can reflect light up towards the ceiling to bring light further into the room, but the degree of illumination is not directly controllable.

Another common solution to handling the solar energy on a vertical window is coatings and films that change the optical properties of the window glazing to either reflect or absorb selective bands of the visible and infrared spectrum. These have the advantage of reducing the need for internal window treatments, but these are typically permanent changes to the window characteristics and so they permanently reduce the amount of solar energy available for useful illumination and heating. There is considerable research and development in windows with electrochromic coatings that allow direct control of the transmissivity of the glazing. These currently suffer from high cost and slow reaction time.

There is believed to be a window treatment commercially available in Europe that allows the user to selectively prefer heating or lighting, but the product does not provide for complete reflection of a portion of unwanted solar energy.

Moreover, the solar radiation into the side windows of a building is present for only a few hours of the day—either morning, noon, or afternoon. To take best advantage of this intermittent heat source, it is common practice in passive solar heating design to include some type of thermal storage so that the heat gathered over, for example, three or four hours can be spread over a longer period to avoid overheating during the sun periods and to provide comfort for hours afterwards.

Typical window shades block or absorb sunlight and convert the sunlight into heat on the shades which is brought into the room by thermal convection. The temperature of the air that rises from the back of the window shade is typically only 10° or 15° warmer than the room air. This provides little temperature differential to drive thermal storage. A very large mass is required to store a significant amount of heat with such a small temperature difference. Therefore, typical window shades and blinds have very little ability to store any of the heat and therefore the heat that they do provide to the room is highly variable in a function solely of the heat input through the window.

Therefore, there remains a need in the art of solar energy management systems to simultaneously provide for the control of lighting and temperature in a room that is easy to manufacture and deploy and that reliably manages both lighting and temperature conditions over an extended period and in varied conditions (such as varying sunlight conditions).

DISCLOSURE OF THE INVENTION

Disclosed is a system and method for harvesting solar energy, and more particularly an automated, tracking internal Venetian window blind that provides even, precisely controlled illumination of the room while simultaneously providing either radiant heat when the building is in heating mode or heat rejection when the building is in cooling mode.

The invention employs curved louvers similar in appearance to Venetian blinds. The blinds are hung from the internal frame of the window, which is preferably clear glass with no reflecting or other energy management features. Each louver has a highly reflecting specular mirrored surface on the front of the louver (the side facing outside). The louver has the concave side up (opposite of conventional blinds). The shape of the louver is designed to focus the incoming solar beam radiation onto a thin area on the back of the adjacent louver.

The angle of the mirrored louvers is adjusted by an integral automatic controller so that the thin strip of light reflected from the front of one louver can be focused on one or two of three regions on the back of the adjacent louver. The three areas of the louver are designed to either reflect, absorb, or reject the incoming light; the controller may determine the desired louver angle based on inputs from local sensors, the building energy management system, and user preferences. The three areas are designed so that the solar energy usage can be smoothly adjusted from, at one extreme, full heating, then to a mix of heating and lighting, then to full lighting, then to a mix of lighting and cooling, and then to full cooling (rejection). This allows the priority use of the sunlight to be lighting. Then the excess energy can be either converted to radiant heat or sent back outside.

The system described herein is thus configured to control both lighting and heating load on a building. With regard to lighting, the most beneficial use of incoming solar energy is in the form of daylighting for illumination of the room. Natural light has many advantages over artificial lighting, including improved visual acuity, health and productivity benefits, and lower heat gain per unit of light delivered than typical electric lighting. A typical fluorescent light fixture provides about 70 lumens of light per watt of power input, compared to natural daylight at 100 lumens per watt. So for the same degree of illumination, daylighting requires zero electric light power consumption, and also has 30% lower thermal load on the air conditioning system compared to typical artificial light. The high value of the lighting functionality is the reason that the system described herein is designed to have light diffusion and delivery as the primary or preferred mode, with heating/cooling as secondary. As noted above, illumination coming directly from a window must be attenuated to a large degree to avoid uncomfortable glare. This attenuation, while improving the lighting aspects, is undesirable to the extent that it increases heat generation and makes use of only a portion of the incoming light as illumination. A much larger portion of the incoming light can be used for illumination if the light is reflected up onto the ceiling deeper into the room; this is what the system described herein accomplishes. When the blind is in lighting mode, some or all of the concentrated light is focused onto a secondary mirror which both reflects and scatters the light up towards the ceiling, away from the occupant's eye level to provide even, reflected light to the space from above. The amount of illumination provided can be precisely controlled by directing a portion of the concentrated beam onto either the heating or cooling regions of the receiver. Illumination is only useful and desired when the room is occupied; thus, the illumination from the proposed product can be directly controlled by manual switching or an occupancy sensor to switch to heating or cooling mode as desired.

Most of the functionality of the proposed product is directed towards managing direct incoming solar radiation. When the amount of direct beam solar radiation is low due to cloud cover or the position of the sun in the sky, the blinds can be programmed to move to an open position or even to a fully raised position to allow maximum diffuse radiation into the space and to provide the maximum view to the outside for the occupant.

With regard to the heating load on a building, such heating load is dependent primarily on the outside air temperature, the degree of thermal insulation of the building, the amount of internal heat generation in the building, and the amount of incoming solar radiation through windows and skylights. Given the combination of these factors, each building has a "balance point" temperature where internal heat gains equal the heat loss to the outside. When the outside air temperature falls below this balance point, heating is required to maintain comfortable internal temperature, and above this point, cooling is required. Commercial buildings typically have tighter envelopes and higher internal heat generation intensities, and have lower balance point temperatures than residential buildings. If the energy transmitting properties of the window area can be directly controlled, this balance point can be extended to a "balance band" where neither heating nor cooling is required to maintain internal comfort levels. Thus, controlling the properties of the windows in buildings with high levels of fenestration has the potential to save a great deal of energy in the heating and cooling systems, and can be a key element to a Net Zero building.

The objective of the heating function of the system described herein is to convert the incoming solar beam radiation into radiant thermal energy that can be projected deep into the room to enhance the thermal comfort of the occupants. The thermal comfort of a building occupant is a function of the temperature and velocity of the immediately surrounding air as well as the temperature and radiant properties of the internal surfaces of the room. If a person is sitting near a large window which has a low temperature of the glass surface, he may feel cold even though the air temperature near his skin is warm. This is because his body will be radiating heat to the window because the window surface temperature is colder than his skin temperature. Conversely, it is possible for one to feel comfortable in a room with relatively low air temperature if the temperature of the walls and floor are relatively high. This is the principle behind radiant floor heating in homes and commercial buildings whereby energy savings can be achieved by lower indoor air temperatures while maintaining or improving comfort.

In terms of the system described herein, the primary desired characteristic for heating is to absorb the incoming solar radiation to heat the room. Secondarily, it is desirable to have a significant fraction of the heat be radiated into the room as opposed to convected as hot air. Heat that is radiated from the window blind counters the "cold window" effect and can instantaneously project the heat to the occupant and the surfaces in the room, as opposed to heating the air alone and relying on ventilation to move the heat into the room. The degree of radiation from a surface is proportional to the emissivity of the surface and to the fourth power of absolute temperature. A surface with a high emissivity that is heated to 170 F will project about 40% of its heat as radiation into the room, with the balance transferred as heat to the room air by convection. It is thus desired that the thermal receiving area of the blind reach a high temperature by having high absorptivity and emissivity, combined with a low surface area and thermal isolation from conductive losses.

In order to maximize the usage of the captured heat, and in accordance with certain aspects of an embodiment of the invention, a room ceiling may also be configured as a thermal storage medium capable of storing heat radiated from the window over an extended duration.

Likewise, when the building energy balance is positive, the HVAC system enters cooling mode. In most residential buildings and many commercial buildings, one of the most significant components of building heat load is the solar heat gain through the windows. When in cooling mode, the most desirable characteristic of the window, after providing the desired illumination, is to reflect the solar radiation back to the outside environment. The system described herein accomplishes this by directing the focused beam of concentrated light onto a secondary mirror that is oriented to reflect the radiation straight out of the window. As with the heating mode, the blind controller can proportionally allocate the amount of energy directed to illumination versus rejection. This allows lighting to be the primary mode and heat rejection secondary.

BRIEF DESCRIPTION OF THE DRAWINGS

The numerous advantages of the present invention may be better understood by those skilled in the art by reference to the accompanying drawings in which.

BEST MODE(S) FOR CARRYING OUT THE INVENTION

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1A:
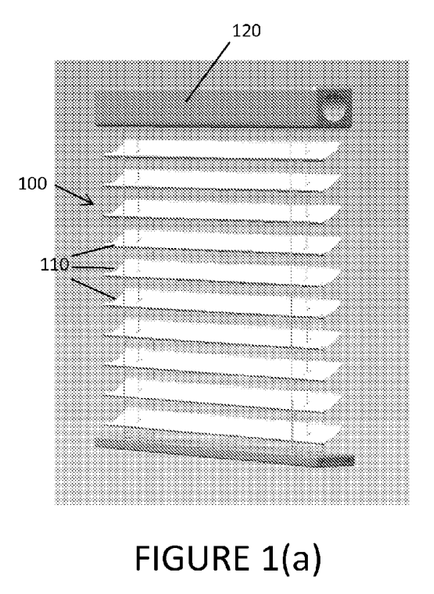
FIG. 1(a) is a front perspective view of a window blind solar energy management system according to certain aspects of an embodiment of the invention.
Figure 1B:
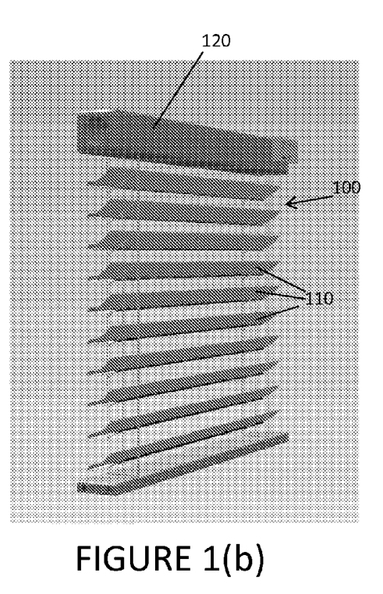
FIG. 1(b) is rear perspective view of the window blind solar energy management system of FIG. 1(a).

FIGS. 1(a) and 1(b) provide front and rear perspective views, respectively, of a window blind solar energy management system (shown generally at 100) according to certain aspects of an embodiment of the invention. As shown in FIGS. 1(a) and 1(b), the system has the superficial appearance of a typical Venetian blind having multiple louvers 110. The enclosure 120 at the top of the system is configured to mount to a window frame (not shown), and houses the motorized mechanisms that raise and lower the blind and adjust the angle of the louvers. While not shown on the figures, those of ordinary skill in the art will recognize that such motorized mechanisms are well known in the art and are thus not discussed further here. Also in the enclosure 120 are the controller board and the sensors (not shown). Sensors may include room temperature sensors, occupancy sensors, and an incoming solar radiation sensor. Optionally, one solar radiation sensor can provide solar data for all the blinds on one side of a building.

Figure 2:
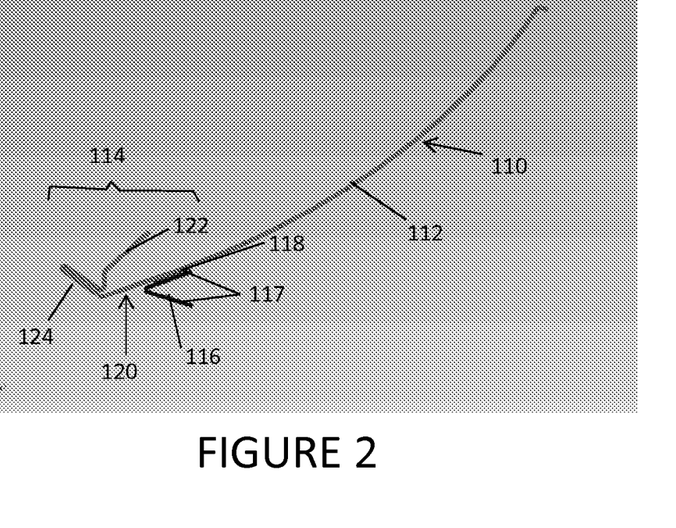
FIG. 2 is a cross-sectional view of a single louver for use in the system of FIGS. 1(a) and 1(b).

FIG. 2 shows a cross-sectional view of a single louver 110 of FIG. 1 in accordance with certain aspects of a particularly preferred embodiment of the invention. The louver 110 is composed of two components: the mirror 112 and a solar energy redirection assembly, which in accordance with certain aspects of an embodiment of the invention comprises reflected light and thermal receiver assembly 114. The mirror 112 is made of a single strip of preferably anodized aluminum sheet that has a highly reflective coating on one side. The shape of the curve of mirror 112 is designed to enable the incoming light to be focused on a narrow strip on the back of the adjacent louver. The range of possible angles of the incident sunlight ranges from zero (horizontal as at sunrise and sunset) and 90 degrees (sun at zenith point). The constraints on the optics design of mirror 112 are such that the degree of focus cannot be perfect over the whole range of possible sun angles. However, the shape of mirror 112 can be optimized to have the best focusing efficiency at the sun angles that have the most solar energy over the year, depending on the location of the building and the orientation of the window. It is anticipated that an average concentration ratio of about 10 is achievable. The shape of mirror 112 can either be a faceted or smooth curve. The faceted shape is more straightforward to manufacture, as a series of simple bending operations can produce the desired shape. It is possible to design the shape such that each bend has the same angle, while the distance between angles varies. Keeping the angle constant simplifies and speeds the bending operation, because the material can be indexed over repeated identical bends. The continuously curved shape is potentially more aesthetically pleasing but requires more expensive tooling to achieve.

The region of the louver that is closest to the window is designated as the reflected light and thermal receiver assembly 114, where the features are located that convert the concentrated light beam to its useful purposes. With particular reference to the cross-sectional view of FIG. 2 and the bottom perspective view of FIG. 3, and in accordance with certain aspects of the embodiment shown in those Figures, a thermal receiver 116 is positioned at the upper end of the receiver assembly 114. This thin strip, preferably about 1 cm in width, is preferably attached using adhesive materials 118 that have very low thermal conductivity. This allows the heating strip of thermal receiver 116 to achieve high temperature to accomplish the desired radiation as mentioned above. The sun-facing surface of the thermal receiver 116 has high absorptivity (e.g., >0.9), and low emissivity (e.g., <0.1). This allows the surface to absorb solar radiation and to avoid reradiating the heat right back out the window. The back side 117 of the surface (not facing the sun) is painted with high emissivity coating that allows the back side 117 of the surface to reflect radiated energy off the back of the louver and towards the ceiling and into the room. If the temperature of the thermal receiver 116 is to be high enough to be a burn hazard, the blind can be outfitted with features that prevent a hand from reaching into the space between the louvers 110, such as wires or fibers strung on the room side of the blind. These might make cleaning of the blinds difficult, so a preferred solution would be warning labels.

Figure 3:
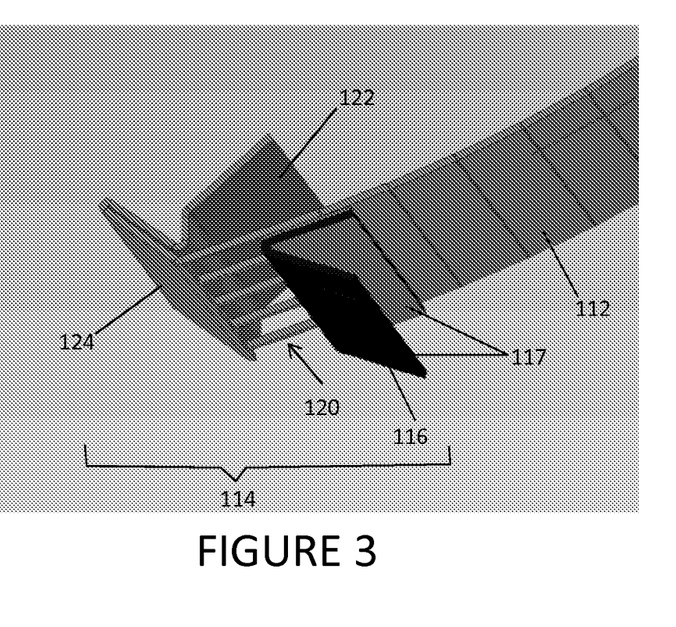
FIG. 3 is a close-up, bottom perspective view of the single louver of FIG. 2.

Below the thermal receiver 116 is an aperture 120 that is cut or otherwise formed in the mirror 112 to allow light to strike a secondary mirror 122 that provides illumination. The shape and surface properties of secondary mirror 122 are selected to direct the light away from the occupant's direct field of view, towards the ceiling of the room. This degree of direction and diffusion of the light is accomplished by controlling the radius of a concave smooth or faceted shape of mirror 112 which takes the focusing beam and reflects the desired beam width up to the ceiling of the room. To avoid distracting images of the reflected light on the ceiling, the surface of the reflector 122 is preferably made of partially specular, partially diffuse material. These materials are known to those of ordinary skill in the art, as they are commonly used in the design of lighting fixtures to direct light from bulbs while avoiding imaging and glare. The advantage of re-diffusing a highly concentrated beam is that the reflecting and diffusing can be accomplished with a very small amount of material, about one centimeter wide.

In addition to the focused and re-reflected direct beam radiation, a fraction of the diffuse sky radiation is also reflected by the louvers 110 into the space. Roughly speaking, the diffuse radiation (reflected from clouds or scattered by the sky) that comes from the part of the sky between the sun and the horizon will be reflected into the room. If the occupant is close to the window, it is possible that the light projected from the lower louvers 110 may cause uncomfortable glare. If this is a problem, an alternative option is to create horizontal zones or regions of the blind, where the heat rejection/heating is performed by the lower regions and the daylighting is provided by the upper regions. If the louver angle of each zone is independently controllable, this would allow maximum flexibility and control for each zone to be in each mode. Alternatively, each zone could have a fixed offset angle from the adjacent zone such that the heat/light/cooling mode of each zone would be a nonuniform function of the single louver angle setting.

As the beam is directed further downwards by the controller, the light then passes through the slits that are cut in each louver (to form aperture 120) and more fully hits the secondary mirror 122. The rays that strike the lower portion of the secondary mirror 122 are at an angle closer to the horizontal than the rays that strike the upper portion. The mirror shape is designed to focus the converging rays into a beam that is projected onto the ceiling (including by further reflecting such light off of louvers 110, as best shown in FIGS. 4 and 5). The front reflecting surface of the adjacent mirror 112 serves to prevent any of the reflected light from leaving the blind at a shallow angle, preventing any possibility of glare to the room occupant.

For cooling (heat rejection), as the mirrors 112 are further rotated counter-clockwise in the figure, the light beam is directed away from the lighting aperture 120 and towards the other secondary mirror 124 which reflects the rays, causing them to go directly out of the window, which will result in less re-reflection of the light and a greater portion being rejected from the building envelope. Further positioning of the louvers 110 beyond the setting shown results in 100% of the heat being rejected, which would be the desired setting when the room is unoccupied in cooling mode.

Figure 4A:
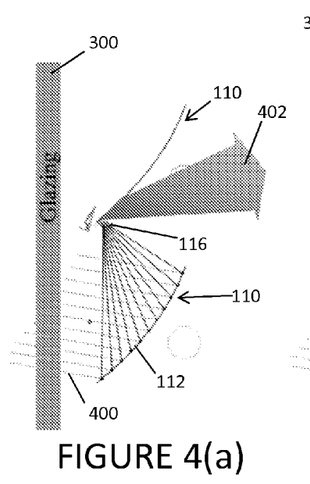
FIGS. 4(a)-4(c) are schematic views of energy flows using the system of FIGS. 1(a) and 1(b) and louvers as shown in FIGS. 2 and 3 in each of a heating mode, a lighting mode, and a cooling mode for low sun angles.
Figures 4B, 4C:
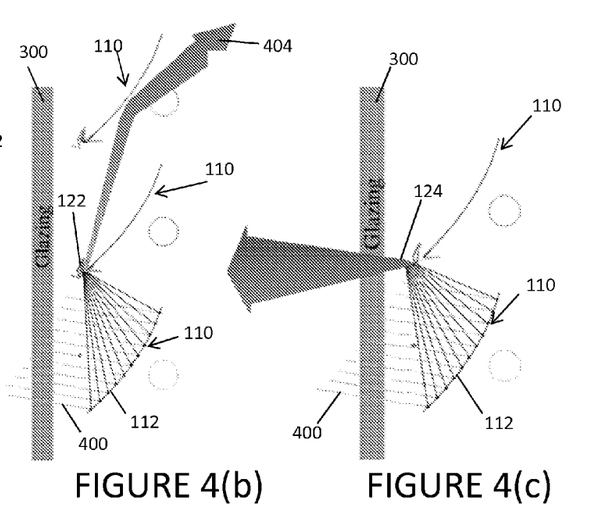

FIGS. 4 and 5 show the function of each of the energy managing surfaces on louvers 110 and the resulting energy flows for varying sun and louver angles. Specifically, FIG. 4(a) shows louvers 110 oriented in a heating mode when sunlight 400 enters the window 300 at a low sun angle. Incoming light 400 is reflected off of a first mirror 112 and is directed into a narrow beam that impacts thermal receiver 116 on the adjacent louver, the back side of which in turn transmits radiated energy 402 towards the ceiling and into the room. FIG. 4(b) shows louvers 110 oriented in a lighting mode when sunlight 400 enters window 300 at a low sun angle. Incoming light is again reflected off of a first mirror 112 and is directed into a narrow beam that impacts secondary lighting mirror 122 on the adjacent louver, which reflects light 404 towards the ceiling and into the room. Likewise, FIG. 4(c) shows louvers 110 oriented in a cooling mode when sunlight 400 enters window 300 at a low sun angle. Here, incoming light is once again reflected off of a first mirror 112 and is directed into a narrow beam that impacts secondary cooling mirror 124 on the adjacent louver, which reflects light 406 back out through window 300 and away from the room.

Figure 5A:
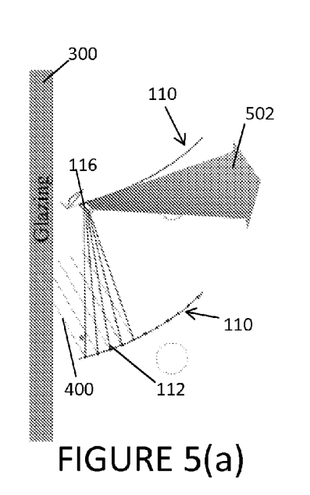
FIGS. 5(a)-5(c) are schematic views of energy flows using the system of FIGS. 1(a) and 1(b) and louvers as shown in FIGS. 2 and 3 in each of a heating mode, a lighting mode, and a cooling mode for high sun angles.
Figures 5B, 5C:
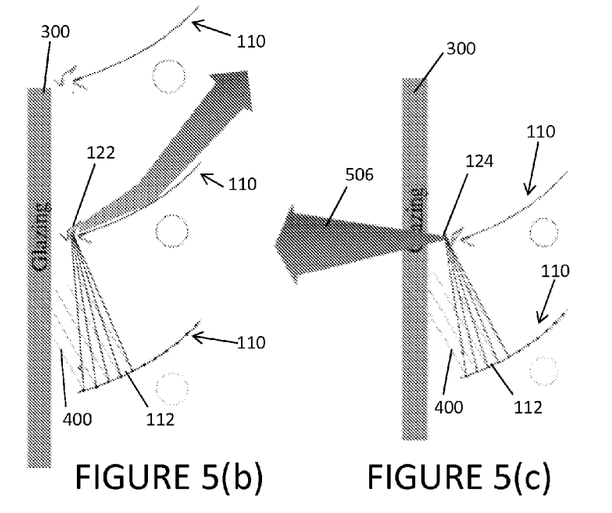

Similarly, FIG. 5(a) shows louvers 110 oriented in a heating mode when sunlight 400 enters the window 300 at a high sun angle. Incoming light 400 is reflected off of a first mirror 112 and is directed into a narrow beam that impacts thermal receiver 116 on the adjacent louver, the back side of which in turn transmits radiated energy 502 towards the ceiling and into the room. FIG. 5(b) shows louvers 110 oriented in a lighting mode when sunlight 400 enters window 300 at a high sun angle. Incoming light is again reflected off of a first mirror 112 and is directed into a narrow beam that impacts secondary lighting mirror 122 on the adjacent louver, which reflects light 504 towards the ceiling and into the room. Likewise, FIG. 5(c) shows louvers 110 oriented in a cooling mode when sunlight 400 enters window 300 at a high sun angle. Here, incoming light is once again reflected off of a first mirror 112 and is directed into a narrow beam that impacts secondary cooling mirror 124 on the adjacent louver, which reflects light 506 back out through window 300 and away from the room.

With regard to further aspects of an embodiment of the invention, the surfaces on louvers 110 that provide heating and cooling functions may alternatively be reversed, which in certain implementations may provide better performance and which will be easier to manufacture. More particularly, and as shown in the bottom perspective view of FIG. 6, cooling secondary mirror 124 may be positioned at the upper end of reflected light and thermal receiver assembly 114. This configuration avoids the potential challenges relating to attachment of thermal receiver 118 directly to primary mirror 112, as temperature variations in thermal receiver 118, in turn causing thermal expansion with every heating cycle, could make such attachment difficult to maintain. The cooling secondary mirror 124 reflects almost all of its light and therefore is not expected to have significant temperature variations.

Figure 6:
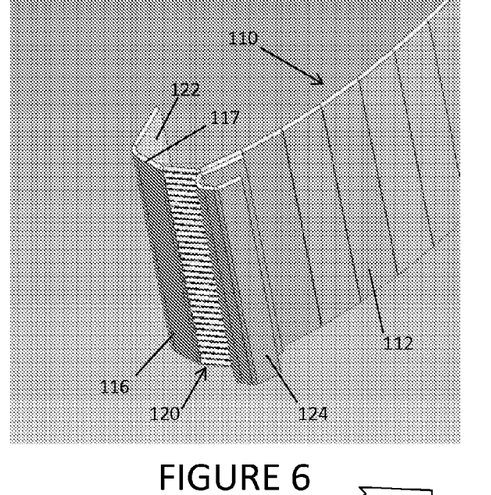
FIG. 6 is a close-up, bottom perspective view of a single louver for use in the system of FIGS. 1(a) and 1(b) according to further aspects of an embodiment of the invention.

With regard to the embodiment shown in FIG. 6, the aperture 120 for allowing the light beam to strike lighting secondary mirror 122 is again formed by a series of slots cut at the base of the primary mirror 112. However, in this configuration, the slots perform two functions. In addition to allowing light to pass through to strike lighting secondary mirror 122, the narrow strips of material that create aperture 120 also serve to thermally isolate thermal absorber 116 from primary mirror 112. Load calculations show that with 90% of the material cutaway and 10% of the mirror left as the bridge, a large temperature difference between thermal absorber 116 and primary mirror 112 can be maintained.

In this embodiment, thermal radiator 117 is positioned adjacent aperture 120 (opposite cooling secondary mirror 124), where it has a better view of the ceiling of the room. The heat radiated from the top of the thermal radiator 117 is reflected by secondary lighting mirror 122, the front face of primary mirror 112, and the back face of the adjacent primary mirror. These surfaces are all highly reflective to infrared radiation and serve to direct such radiation towards the ceiling of the room where, with regard to further aspects of an embodiment of the invention, it can be captured by thermal storage media as discussed in greater detail below. In this embodiment, all of the high temperature surfaces (the thermal absorber 116, lighting secondary mirror 122, and thermal radiator 117) are pointing away from the occupants of the room. This significantly reduces the burn hazard associated with high temperature components. As shown in FIG. 6, these high temperature surfaces would be difficult to touch if one were casually placing one's fingers near the louvers 110. This effectively increases the upper limit of the safe temperature of the thermal receiver 116. It is also beneficial in that the fraction of the heat that is lost by conduction occurs on the window side of the blind as opposed to the room side of the blind. Having the heat released on the window side of the blind counteracts the downward draft of cold air that comes from a cold window surface.

Figure 7A:
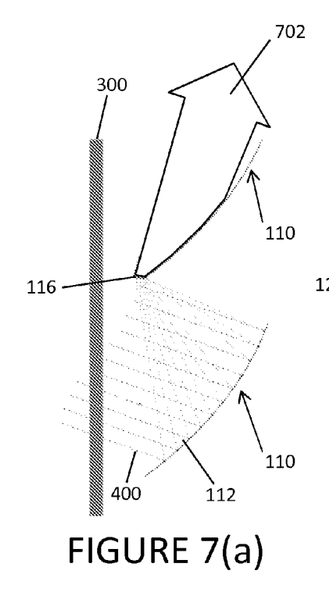
FIGS. 7(a)-7(c) are schematic views of energy flows using the system of FIGS. 1(a) and 1(b) and louvers as shown in FIG. 6 in each of a heating mode, a lighting mode, and a cooling mode for midrange sun angles.
Figures 7B, 7C:
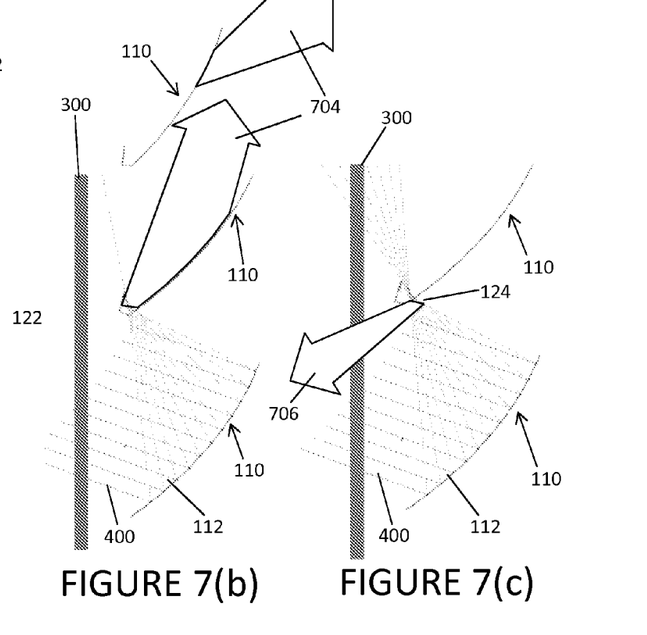

The path of the energy flows using a louver as shown in FIG. 6 are shown in the diagrams of FIGS. 7(a)-7(c) for a midrange sun angle. Specifically, FIG. 7(a) shows louvers 110 oriented in a heating mode when sunlight 400 enters the window 300 at a midrange sun angle. Incoming light 400 is reflected off of a first mirror 112 and is directed into a narrow beam that impacts thermal receiver 116 on the adjacent louver, the back side of which in turn transmits radiated energy 702 towards the ceiling and into the room. FIG. 7(b) shows louvers 110 oriented in a lighting mode when sunlight 400 enters window 300 at a midrange sun angle. Incoming light is again reflected off of a first mirror 112 and is directed into a narrow beam that impacts secondary lighting mirror 122 on the adjacent louver, which reflects light 704 towards the ceiling and into the room. Likewise, FIG. 7(c) shows louvers 110 oriented in a cooling mode when sunlight 400 enters window 300 at a midrange sun angle. Here, incoming light is once again reflected off of a first mirror 112 and is directed into a narrow beam that impacts secondary cooling mirror 124 on the adjacent louver, which reflects light 706 back out through window 300 and away from the room.

While FIGS. 7(a)-7(c) show the louvers of FIG. 6 only at use in a midrange sun angle setting, such louvers, as well as those shown in FIGS. 2 and 3, can all be used throughout the sun angles that might impact the system of FIGS. 1(a) and 1(b) to manage lighting and temperature within the room in which such system is installed.

Also provided is a low cost smart controller board that manages the height of the blinds and the angle of the louvers. The key control inputs are:

total solar radiation incident on the window;
fraction of solar radiation that is direct vs. diffuse;
mode of the building heating/cooling system;
desired room illumination level; and
actual room illumination level.

With regard to another aspect of an embodiment of the invention, the window blind system described above may concentrate the sun's rays by a factor of ten onto thermal absorbing strip 116. This thin strip is designed to radiate most of the incoming solar energy towards the ceiling at a much higher temperature than the air convected from a typical blind or shade. Depending on the angle of the sun, this thin strip will reach temperatures of 150 to 180° F. This provides a much higher temperature differential to drive thermal storage.

Figure 8:
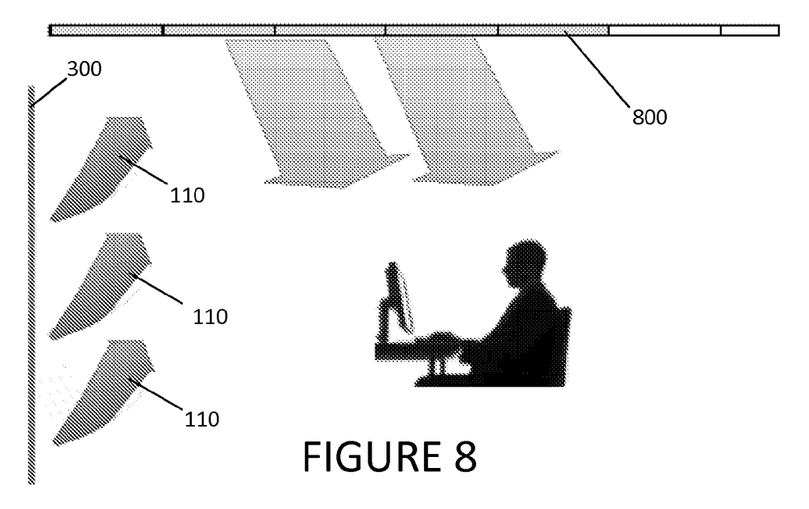
FIG. 8 is a schematic view of a room in which the system of FIGS. 1(a) and 1(b) is in use.
Figure 9:
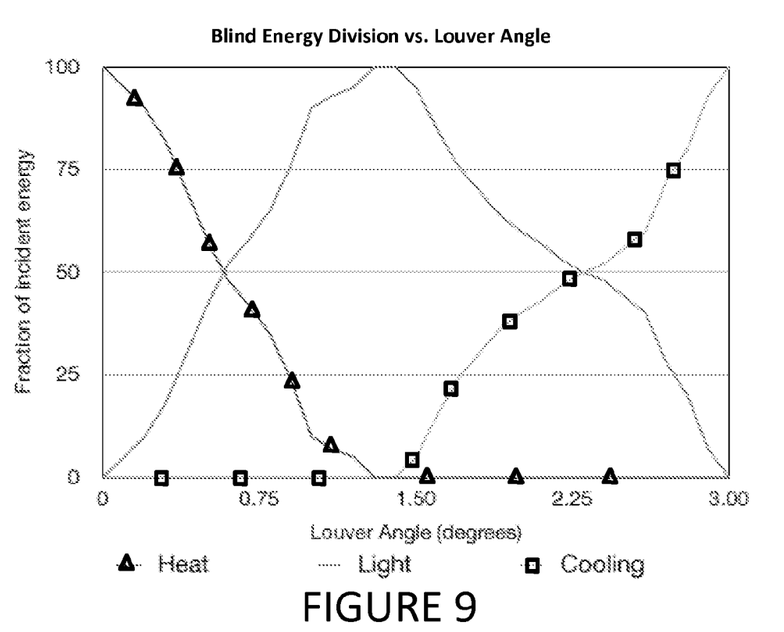
FIG. 9 is a graph showing blind energy division versus louver angle for the system of FIGS. 1(a) and 1(b).

With reference to the schematic view of FIG. 8, projecting the heat away from the window 300 and towards the ceiling 800 allows the ceiling itself to become the thermal storage medium. Heat radiated from the ceiling 800 has a much better view factor to the occupants of the room and can provide a more comfortable radiant environment than heat radiated from the window. The ceiling tiles in a typical suspended ceiling design are capable of carrying a significant amount of weight for thermal storage media. Thermal storage in the ceiling tiles can be accomplished in a number of ways. For existing ceiling tiles, the tiles can be painted with paints that are impregnated with microencapsulated phase change materials. The phase change materials inside the micro encapsulation can be designed to change phase at a temperature that is tuned to what the inventive blinds described herein can deliver. Similarly, the phase change material can be embedded in the ceiling tiles themselves; that is, the microencapsulated phase change pellets can be mixed with the media of which the ceiling tiles are made. Finally, bags containing the phase change material can simply be placed on top of the ceiling tiles; however, the insulating property of the ceiling tiles can isolate the phase change material from the heat source. In this case, the performance could be improved if the ceiling tiles were made of a more conducting material such as painted sheet-metal. In any case, the ceiling tiles should be made of materials which are highly reflective of visible light and also provide some diffusion in the reflection properties.

An exemplary system design utilizing this thermal storage configuration is as follows. A multistory office building with an exposed east or southeast facing side that has clear glass windows installed on that side could have the entire side of the building act as a solar thermal collector with the heat that is collected being delivered as comfortable radiant heat from the ceiling spread out from the mornings through the midafternoon. For south facing glass, the majority of the direct solar radiation would occur in the late morning and early afternoon in the winter when the heat is most needed. The thermal storage would spread the heat over several hours through the late afternoon. The thermal storage would be less useful for west facing windows because the available heat would be spread out during unoccupied periods. Thus, for west facing windows the massive thermal storage could be reduced so that the heat is delivered more immediately.

The desired room illumination level is preferably determined by a time of day/day of week clock combined with real time inputs of a manual light switch or occupancy sensor. If the direct solar radiation is below a threshold, the blind is preferably configured in Full View mode, and the blinds are either set to a horizontal angle, or raised completely. If the direct solar radiation incident is above a threshold that would cause glare, the blind preferably goes into tracking mode. First priority preferably is to achieve the desired illumination level. If the illumination setpoint is exceeded (as could occur if the room was unoccupied and the setpoint is zero, or if the solar radiation is strong), the controller preferably biases towards either heating or cooling. The selection of heating or cooling bias may be based on the status of the building HVAC system. It is proposed that the status of the building system be monitored from one or more central points of the building energy control system, and the status broadcast wirelessly to the blind controllers. This makes it unnecessary for the blind controllers to have knowledge of the room temperature or other details.

Furthermore, one of the desired features of a window is providing a view to the outside for the building occupants. While the reflecting optics described herein do not allow unobstructed viewing at all times, the system described herein does have features to provide views. First, when direct beam sunlight is not falling on the window, the blinds can be put at an angle that allows direct viewing between the louvers, or the blinds can be fully raised. When the louvers are in tracking mode, a direct view does exist between the louvers, depending on the angle of the sun and the focus point on the receiver. An alternative that can provide a higher view fraction would be to cut microgrooves in the louver and to form the effective mirror shape as a Fresnel technique that would have many narrow viewing slits in each mirror.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

INDUSTRIAL APPLICABILITY

The present invention is applicable to managing illumination and temperature through the use of solar energy. The invention discloses a system of louvers hung in a window blind assembly with regions configured to reflect, absorb, or reject incoming light. The system can be made in industry and practiced in the field of environmental controls.

The invention claimed is:
1. A solar energy management system comprising:
a first louver;
a second louver positioned adjacent said first louver, wherein said first louver is oriented with respect to said second louver to reflect light toward said second louver;
said second louver further comprising a solar energy redirection assembly oriented to receive reflected light from said first louver, said solar energy redirection assembly further comprising:
a light reflection portion configured to reflect light from said first louver in a direction that is behind said system and above an upper face of said second louver;
a heat absorption and radiation portion, further comprising a heat absorption strip extending across said second louver and facing said first louver, said heat absorption strip being configured to absorb heat from reflected light from said first louver, and a heat radiating strip aligned with said heat absorption strip and positioned to radiate heat in a direction that is behind said system; and
a light rejection portion configured to reflect light from said first louver outward in a direction that is in front of said system.
2. The solar energy management system of claim 1, wherein said first louver and said second louver are vertically suspended and are pivotable so as to change an incidence angle of sunlight coming from the direction that is in front of said system and striking said first and second louvers.

3. The solar energy management system of claim 2, wherein said first louver and said second louver are vertically suspended from a housing, said housing further comprising at least one of a temperature sensor, an occupancy sensor, and an incoming solar radiation sensor.

4. The solar energy management system of claim 3, said housing further comprising motor controls operatively attached to said first louver and said second louver and configured to pivot said first louver and said second louver.

5. The solar energy management system of claim 4, wherein said motor controls are automatically responsive to a condition detected by said at least one of a temperature sensor, an occupancy sensor, and an incoming solar radiation sensor to pivot said first louver and said second louver.

6. The solar energy management system of claim 2, wherein said first louver and said second louver are pivotable to achieve a heating mode orientation in which sunlight coming from the direction that is in front of said system reflects off of said first louver, and is directed into a narrow beam that impacts heat absorption and radiation portion on said second louver, after which heat is radiated off of said heat absorption and radiation portion in a direction that is behind said second louver and above said first louver.

7. The solar energy management system of claim 2, wherein said first louver and said second louver are pivotable to achieve a lighting mode orientation in which sunlight coming from the direction that is in front of said system reflects off of said first louver, and is directed into a narrow beam that impacts said light reflection portion on said second louver, after which light is reflected off of said light reflection portion in a direction that is behind said second louver and above said first louver.

8. The solar energy management system of claim 2, wherein said first louver and said second louver are pivotable to achieve a cooling mode orientation in which sunlight passing through said window reflects off of said first louver, and is directed into a narrow beam that impacts said light rejection portion on said second louver, after which light is reflected off of said light rejection portion in the direction that is in front of said system.

9. The solar energy management system of claim 1, said second louver further comprising a mirror adjacent said solar energy redirection assembly, wherein said heat absorption and radiation portion is thermally insulated from said mirror.

10. The solar energy management system of claim 9, wherein said heat absorption and radiation portion is attached to said mirror with a thermally insulating adhesive.

11. The solar energy management system of claim 9, wherein said heat absorption and radiation portion is attached to said mirror by a plurality of fins.

12. The solar energy management system of claim 1, wherein said first louver further comprises a reflective sheet having a concave upper surface.

13. A solar energy management system comprising:
at least one pivotably mounted louver, said louver further comprising:
  a mirror; and
  a solar energy redirection assembly positioned at a first end of said louver, said solar energy redirection assembly further comprising:
    an aperture positioned to allow light to pass through said louver;
    a secondary lighting mirror configured to reflect light passing through said aperture upward and away from said first end of said louver; and
    a secondary cooling mirror configured to reflect light away from said louver.

14. The solar energy management system of claim 13, wherein said mirror comprises a curved reflected surface configured to reflect incoming light into a narrow strip an adjacent surface.

15. The solar energy management system of claim 14, wherein said adjacent surface comprises a second pivotably mounted louver.

16. The solar energy management system of claim 13, wherein said secondary lighting mirror has a light diffusing surface comprising partially specular and partially diffuse material.

17. The solar energy management system of claim 13, further comprising a second pivotably mounted louver that is identical in construction to said at least one pivotably mounted louver, wherein said louvers are vertically suspended adjacent a window and are pivotable so as to change an incidence angle of sunlight coming through said window and striking said louvers.

18. The solar energy management system of claim 17, said system further comprising at least one of a room temperature sensor, an occupancy sensor, and in incoming solar radiation sensor.

19. The solar energy management system of claim 18, where said system is automatically responsive to a condition detected by said at least one of a room temperature sensor, an occupancy sensor, and an incoming solar radiation sensor to pivot said louvers.

* * * * *